US012746992B2

(12) United States Patent
Neuhaus

(10) Patent No.: US 12,746,992 B2
(45) Date of Patent: Sep. 29, 2026

(54) FOLDABLE TOW DOLLY

(71) Applicant: Nathan Neuhaus, Caledonia, NY (US)

(72) Inventor: Nathan Neuhaus, Caledonia, NY (US)

( * ) Notice: Subject to any disclaimer, the term of this patent is extended or adjusted under 35 U.S.C. 154(b) by 396 days.

(21) Appl. No.: 18/357,395

(22) Filed: Jul. 24, 2023

(65) Prior Publication Data

US 2024/0059363 A1 Feb. 22, 2024

Related U.S. Application Data

(60) Provisional application No. 63/392,156, filed on Jul. 26, 2022.

(51) Int. Cl.
*B62D 63/06* (2006.01)
*B60D 1/14* (2006.01)
*B60P 3/06* (2006.01)
*B60P 7/08* (2006.01)
*B62D 29/00* (2006.01)
*B62D 63/08* (2006.01)

(52) U.S. Cl.
CPC ........... *B62D 63/061* (2013.01); *B60D 1/143* (2013.01); *B60P 3/06* (2013.01); *B60P 7/0823* (2013.01); *B62D 29/00* (2013.01); *B62D 63/08* (2013.01)

(58) Field of Classification Search
CPC ......... B62D 63/061; B62D 63/08; B60P 3/06; B60P 3/07; B60P 3/073; B60P 3/075; B60P 3/077
See application file for complete search history.

(56) References Cited

U.S. PATENT DOCUMENTS

| | | | | |
|---|---|---|---|---|
| 3,979,133 A * | 9/1976 | Morris | B62D 21/14 | 280/42 |
| 4,537,421 A | 8/1985 | Teachout | | |
| 5,016,897 A * | 5/1991 | Kauffman | B60P 3/127 | 414/537 |
| 5,326,128 A * | 7/1994 | Cromley, Jr. | B60G 3/145 | 301/128 |
| 5,342,162 A * | 8/1994 | Robinette | B60P 3/127 | 414/537 |
| 5,501,481 A * | 3/1996 | Chumley | B62D 63/065 | 280/476.1 |
| 6,428,035 B1 * | 8/2002 | Maxwell | B62D 63/061 | 280/789 |
| 6,971,654 B2 | 12/2005 | Amsili | | |
| 7,083,182 B2 * | 8/2006 | Clayton | B60P 3/127 | 280/38 |

(Continued)

*Primary Examiner* — Jacob S. Scott
(74) *Attorney, Agent, or Firm* — Brennan, Manna & Diamond, LLC

(57) ABSTRACT

A foldable tow dolly for towing cars and vehicles. The dolly can be folded when not used for easy transportation and storage. The dolly includes a center chassis between a pair of wheel platforms, wherein the wheel platforms are connected to the center chassis and secured using spring-loaded barrel locks. In an unfolded state, the center chassis is supported by an X-brace attachment and a pair of tongues are used for coupling and supporting the dolly to a vehicle for towing. In a folded state, the center chassis is folded upwards and the wheel platforms, after removing the barrel locks, articulate upwards (i.e., vertical) to fold the dolly. The tongues can be removed from the center chassis during folding of the dolly.

20 Claims, 13 Drawing Sheets

(56) References Cited

U.S. PATENT DOCUMENTS

| | | | | |
|---|---|---|---|---|
| 7,770,913 | B2 * | 8/2010 | Cannon | B62D 63/061 280/649 |
| 8,523,197 | B2 | 9/2013 | Baatz | |
| 8,602,443 | B2 | 12/2013 | Moore | |
| 10,272,937 | B2 | 4/2019 | Chen | |
| 2005/0006877 | A1 | 1/2005 | Kachkovsky | |
| 2011/0254249 | A1 * | 10/2011 | Oyasaeter | B62D 63/061 280/491.4 |
| 2013/0038038 | A1 * | 2/2013 | Bernard | B62D 63/061 280/415.1 |
| 2016/0368409 | A1 * | 12/2016 | Ward | B60P 3/077 |
| 2017/0274945 | A1 * | 9/2017 | Tran | B62D 21/12 |
| 2024/0059363 | A1 * | 2/2024 | Neuhaus | B62D 63/08 |
| 2024/0083331 | A1 * | 3/2024 | Hassell | B60P 3/127 |

* cited by examiner

FOLDABLE TOW DOLLY

CROSS-REFERENCE TO RELATED APPLICATION

The present application claims priority to, and the benefit of, U.S. Provisional Application No. 63/392,156, which was filed on Jul. 26, 2022, and is incorporated herein by reference in its entirety.

FIELD OF THE INVENTION

The present invention generally relates to the field of tow dollies. More specifically, the present invention relates to a novel tow dolly that can be folded and whose wheelbase can be adjusted to accommodate different vehicles. The tow dolly has a center chassis made of square metal stock (i.e., steel square bar or steel square tube) and positioned between two-wheel platforms. The wheel platforms are secured to the chassis and a pair of tongues are used in use of the dolly for towing vehicles. The center chassis and the wheel platforms can be folded in opposite directions to fold the dolly for easy storage and transportation. Accordingly, the present disclosure makes specific reference thereto. Nonetheless, it is to be appreciated that aspects of the present invention are also equally applicable to others like applications, devices, and methods of manufacture.

BACKGROUND

By way of background, a tow dolly is a specialized device used for transporting motor vehicles. Commonly, a tow dolly consists of a trailer-like structure that is towed behind a motor vehicle, such as a truck or an RV. The purpose of a tow dolly is to carry another motor vehicle, typically a car, while ensuring that its front or rear wheels are securely mounted on the dolly. Generally, to properly secure the towed vehicle on a tow dolly, several components and connections are required. These typically include straps, chains, or other fastening mechanisms that hold the vehicle in place and prevent it from shifting or falling off the dolly during transport.

However, using a standard tow dolly can sometimes be challenging and frustrating. One issue is that a standard tow dolly may not provide sufficient stability to securely hold the towed vehicle in place. This can lead to the vehicle shifting or swaying during transportation, potentially causing damage, or compromising safety.

Conventional tow dolly is not foldable and cannot be collapsed or compacted for storage or easy transportation when not in use. The lack of foldability can make storage of a tow dolly inconvenient, as the tow dolly takes up a significant amount of space. Further, customizing a conventional tow dolly for towing vehicles of different sizes is difficult which makes their usage limited and difficult.

Therefore, there exists a long felt need in the art for an improved tow dolly for transporting vehicles. There is also a long felt need in the art for a tow dolly that can be folded for easy transportation and storage. Additionally, there is a long felt need in the art for a tow dolly that has barrel locks for folding and unfolding the tow dolly. Moreover, there is a long felt need in the art for an improved tow dolly that includes casters for easily rolling the tow dolly on a surface. Further, there is a long felt need in the art for a foldable tow dolly whose wheelbase can be adjusted for accommodating and supporting vehicles of different sizes. Finally, there is a long felt need in the art for a tow dolly that can be folded and obviates moving the wheels from the axles to fold and store.

The subject matter disclosed and claimed herein, in one embodiment thereof, comprises a foldable car tow dolly. The tow dolly is configured to have transition between a folded state and an unfolded state. The dolly comprises a generally square center chassis, a first wheel platform, a second wheel platform, a first tongue secured to a top side of the center chassis, a second tongue secured to the center chassis and is positioned on top of the first tongue, an X-bar attachment, each wheel platform has an associated wheel and the center chassis has a plurality of casters, the tow dolly is in an unfolded position when the first wheel platform is secured to one side of the center chassis using a pair of spring-loaded barrel locks, the second wheel platform is secured to the opposite side of the center chassis using another pair of spring-loaded barrel locks and the X-bar attachment is connected to the bottom of the center chassis. The tow dolly is in a folded position with the first wheel platform and the second wheel platform being released from the center chassis by releasing barrel locks wherein the tongues are also released from the dolly.

In this manner, the foldable tow dolly of the present invention accomplishes all of the forgoing objectives and provides users with a foldable car tow dolly to make towing an automobile during travel a more convenient experience. The dolly has an adjustable wheelbase and tilt design that eliminate loading difficulties and can be folded when the dolly is not used.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a foldable car tow dolly. The tow dolly comprises a center chassis, a first wheel platform, a second wheel platform, a first tongue secured to a top side of the center chassis, a second tongue secured to the center chassis and is positioned on top of the first tongue, each wheel platform has an associated wheel and the center chassis has a plurality of casters, the tow dolly is in an unfolded position when the first wheel platform is secured to one side of the center chassis using a pair of spring-loaded barrel locks, the second wheel platform is secured to the opposite side of the center chassis using another pair of spring-loaded barrel locks and the tow dolly is in a folded position with the first wheel platform and the second wheel platform released from the center chassis.

In yet another embodiment, each wheel platform has center inner arms which are inserted into the center outer arms of the center chassis for securing the wheel platform and the center chassis, an X-bar attachment is attached to the center chassis using fasteners for providing stability and support to the center chassis.

In a further embodiment, three hinges are welded in the two vertical bars of the center chassis to allow for articulation wherein the center chassis folds upward and the wheel platforms fold downwards.

In yet a further embodiment, the wheel platforms can be extended outwards from the center chassis and pull towards the center chassis to lock in a desired position using the barrel locks to adjust the wheelbase of the tow dolly for accommodating different vehicles.

In yet another embodiment, a foldable tow dolly configured to transform between a folding and non-folding state wherein the folding state is used for storage and transportation of the dolly and the non-folding state is used for towing a vehicle, wherein a pair of wheel platforms having a center chassis therebetween. An upper tongue and a lower tongue are used for connecting the dolly to a rear of a vehicle such as an RV wherein a towed vehicle is placed on the wheel platforms.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
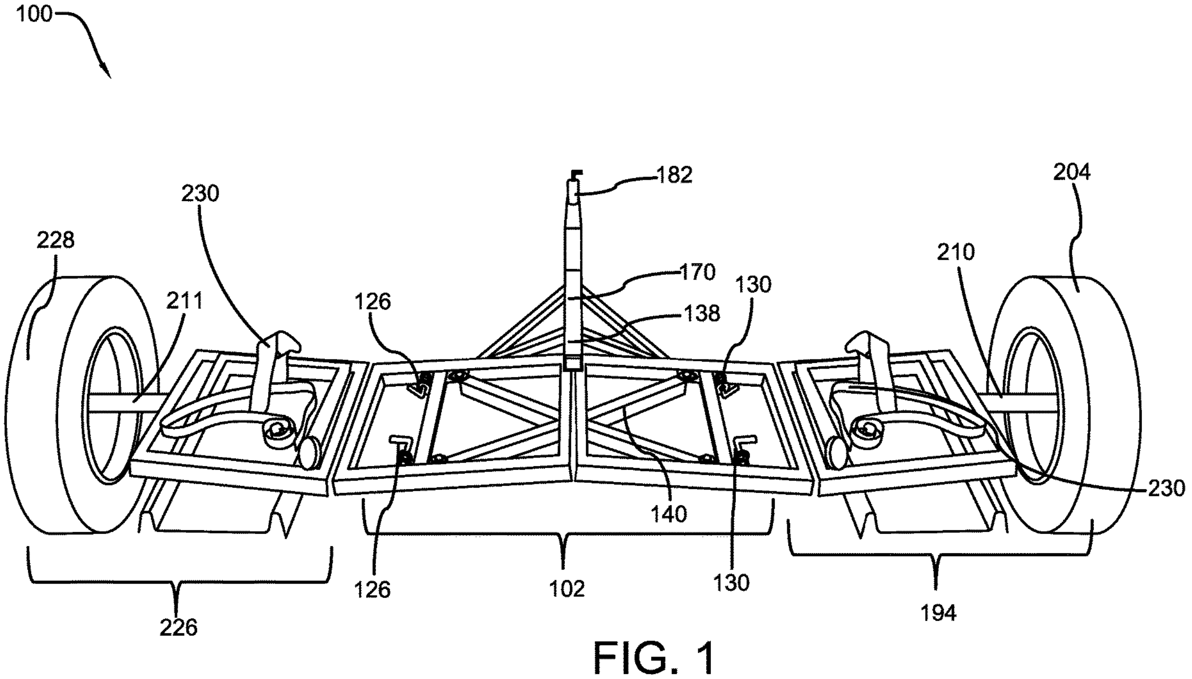
FIG. 1 illustrates a perspective view of a foldable car tow dolly of the present invention in an unfolded position in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for an improved tow dolly for transporting vehicles. There is also a long felt need in the art for a tow dolly that can be folded for easy transportation and storage. Additionally, there is a long felt need in the art for a tow dolly that has barrel locks for folding and unfolding the tow dolly. Moreover, there is a long felt need in the art for an improved tow dolly that includes casters for easily rolling of the tow dolly on a surface. Further, there is a long felt need in the art for a foldable tow dolly whose wheelbase can be adjusted for accommodating and supporting vehicles of different sizes. Finally, there is a long felt need in the art for a tow dolly that can be folded and obviates moving (i.e., removing) the wheels from the axles to fold and store.

The present invention, in one exemplary embodiment, is a foldable car tow dolly. The tow dolly comprises a center chassis, a first wheel platform, a second wheel platform, a first tongue secured to a top side of the center chassis, a second tongue secured to the center chassis and is positioned on top of the first tongue, each wheel platform has an associated wheel and the center chassis has a plurality of casters, the tow dolly is in an unfolded position when the first wheel platform is secured to one side of the center chassis using a pair of spring-loaded barrel locks, the second wheel platform is secured to the opposite side of the center chassis using another pair of spring-loaded barrel locks and the tow dolly is in a folded position with the first wheel platform and the second wheel platform released from the center chassis.

Referring initially to the drawings, FIG. 1 illustrates a perspective view of the foldable car tow dolly of the present invention in an unfolded position in accordance with the disclosed architecture. The tow dolly 100 of the present invention is designed as a foldable dolly to make the dolly transport and store easily. The dolly 100 can be handled easily and it is convenient for users to load a vehicle. During use, the dolly 100 can be unfolded and can be folded during storage. The tow dolly 100 includes a center chassis 102, a pair of wheel platforms 194, 226 wherein the wheel platforms 194, 226 are attached to the opposite sides of the center chassis 102 as described in FIGS. 7 and 8. The platform 194 has a wheel 204 and the platform 226 has the wheel 228 for movement of the tow dolly 100 over a surface.

Referring to FIGS. 1, 2, 3 and 8, the barrel locks or locking pins 126, 130 are locked for securing the wheel platforms 194, 226 respectively with the center chassis 102 for keeping the tow dolly 100 in the unfolded position. The barrel locks or locking pins 126, 130 can be removed for articulating and folding the tow dolly 100 when it is not in use for towing a vehicle.

Figure 4:
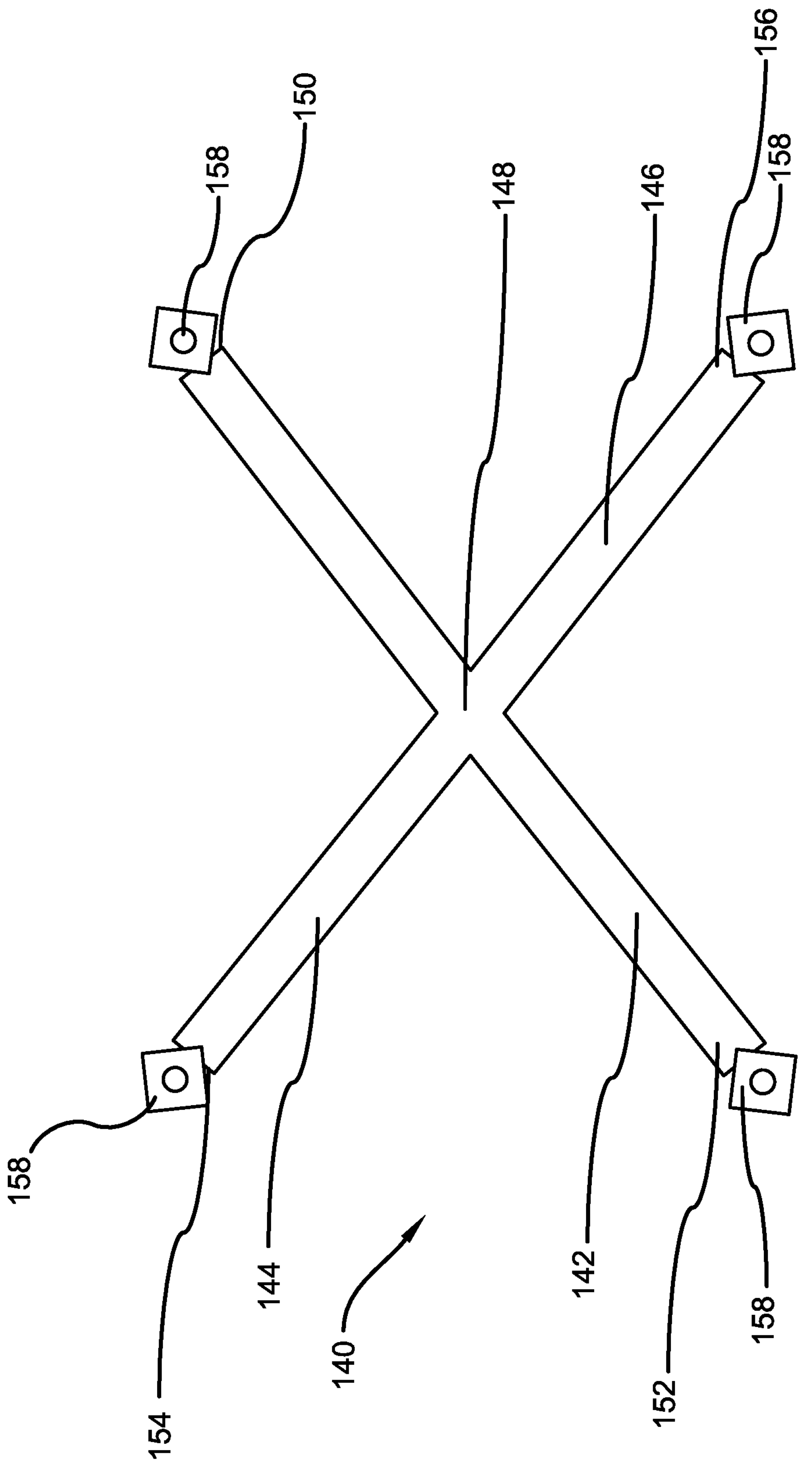
FIG. 4 illustrates a top perspective view of the X-brace attachment used in the tow dolly of the present invention in accordance with the disclosed structure.
Figure 5:
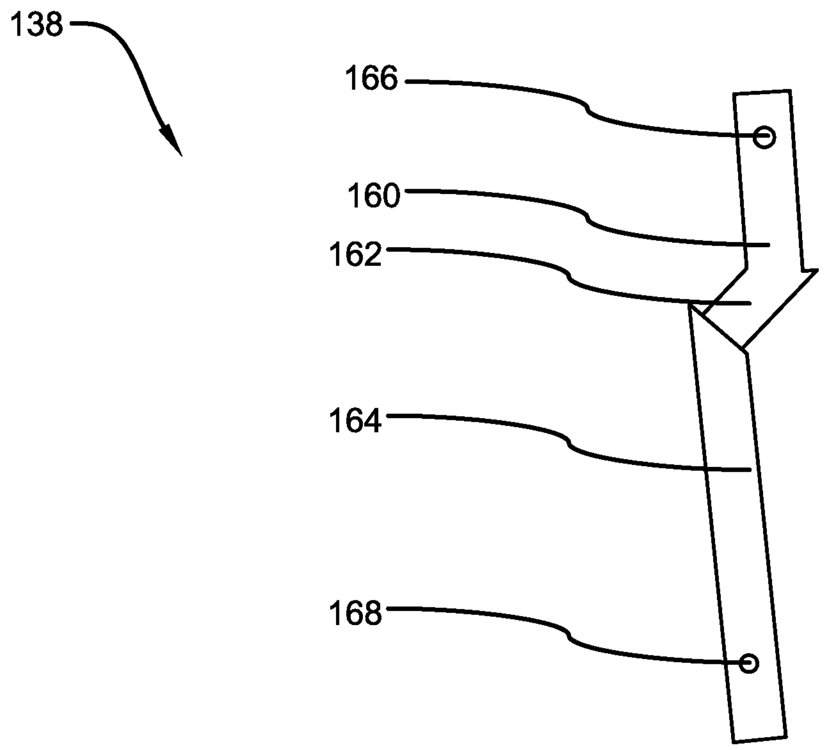
FIG. 5 illustrates a perspective view of the top tongue used in the tow dolly of the present invention in accordance with the disclosed architecture.
Figure 6:
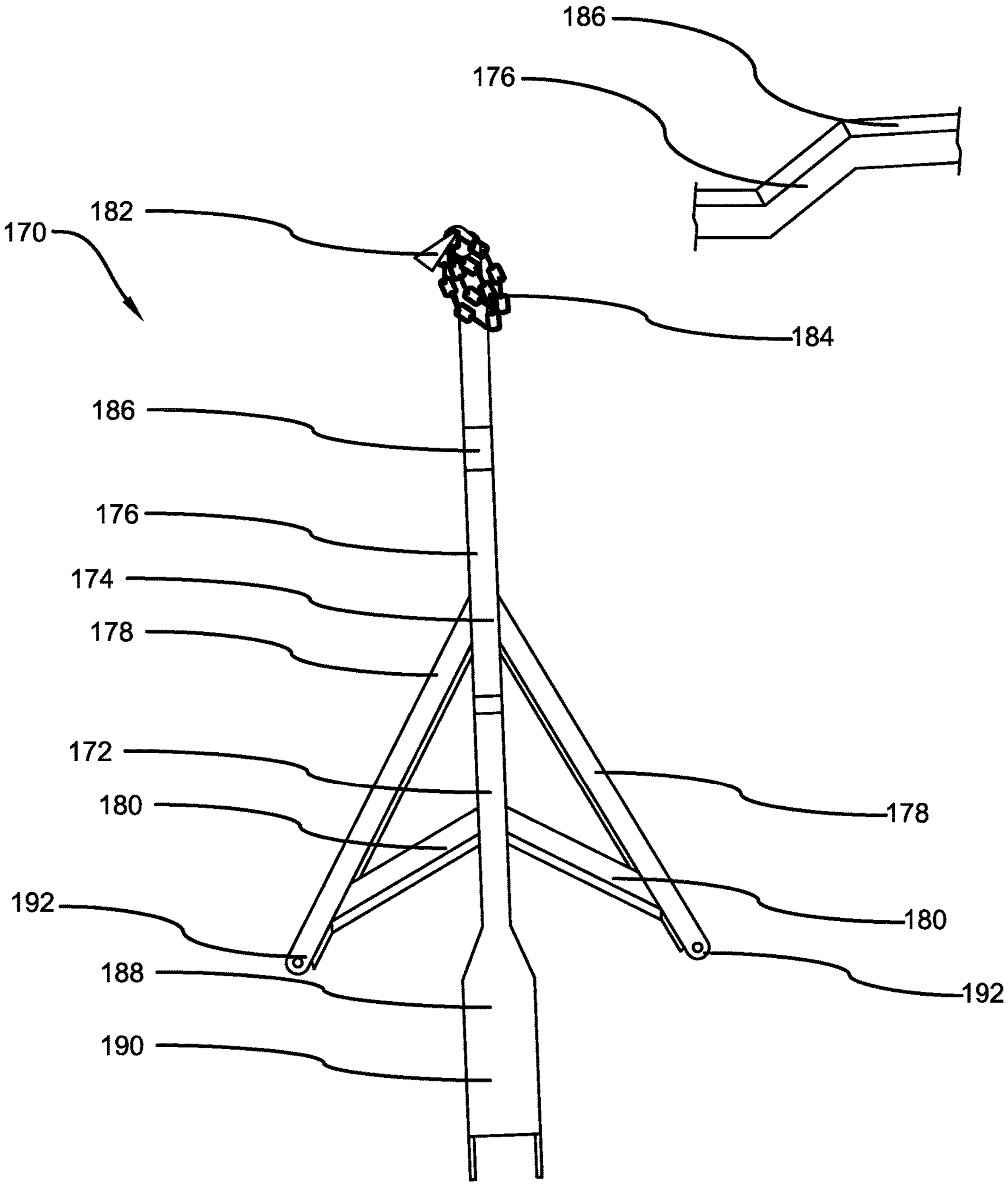
FIG. 6 illustrates a perspective view of the bottom tongue used in the tow dolly of the present invention in accordance with the disclosed architecture.
Figure 8:
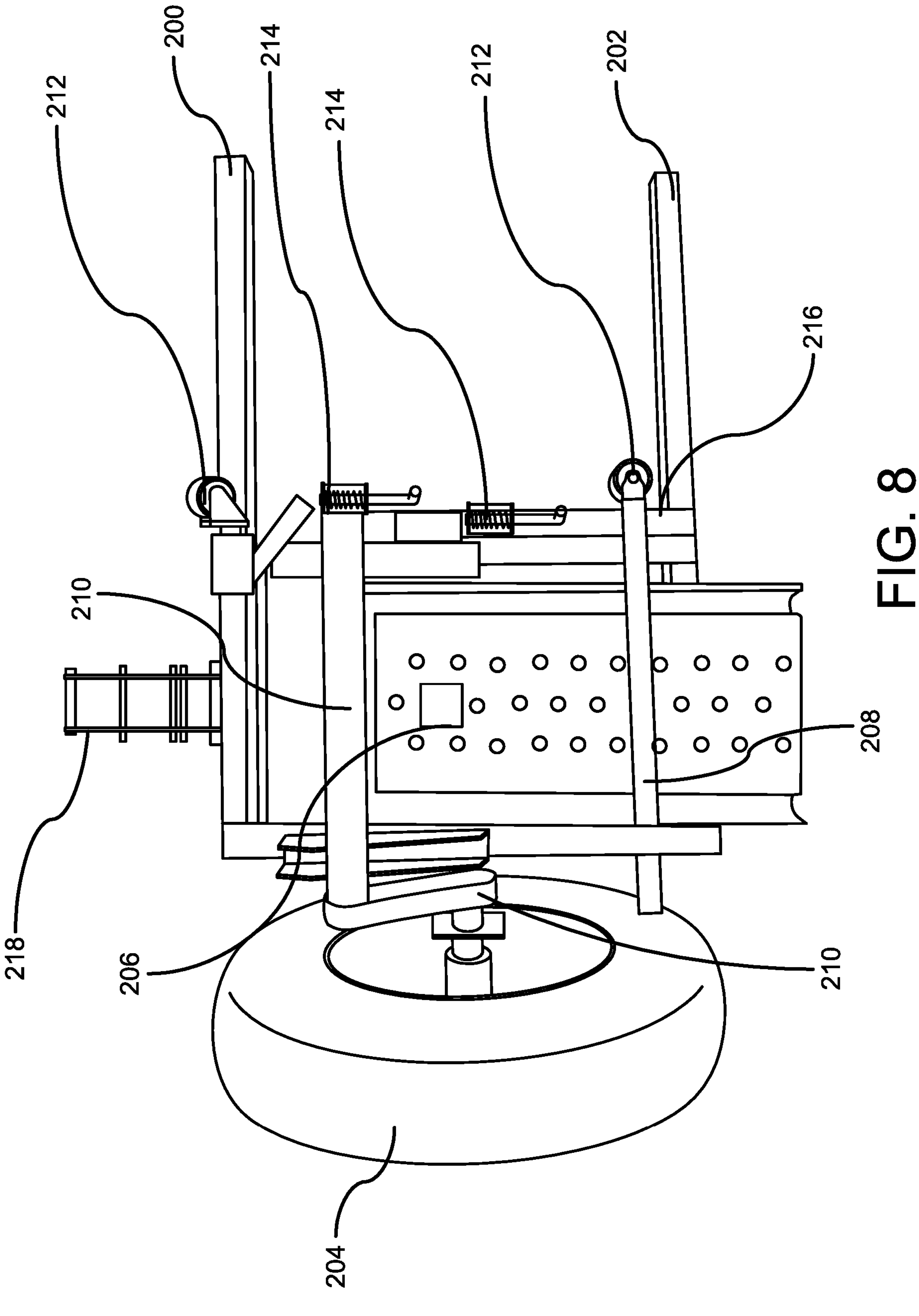
FIG. 8 illustrates the bottom view of the wheel platform of FIG. 7 in accordance with disclosed structure.

The X-brace attachment 140 as illustrated in FIG. 4 is secured to the center chassis 102 for providing stability to the center chassis 102 during towing of a vehicle. The bottom tongue 170 as illustrated in FIG. 6 is attached to the center chassis 102 for towing a vehicle using the receiver coupler 182. Further, the top tongue 138 as illustrated in FIG. 5 is used for supporting the bottom tongue 170 and is positioned on top of the bottom tongue 138 during the towing process. Basket straps 230 are used for securing a towed vehicle for preventing any movement thereof and the straps 230 can be secured using a ratchet positioned in each wheel platform as illustrated in FIG. 8.

Figure 2:
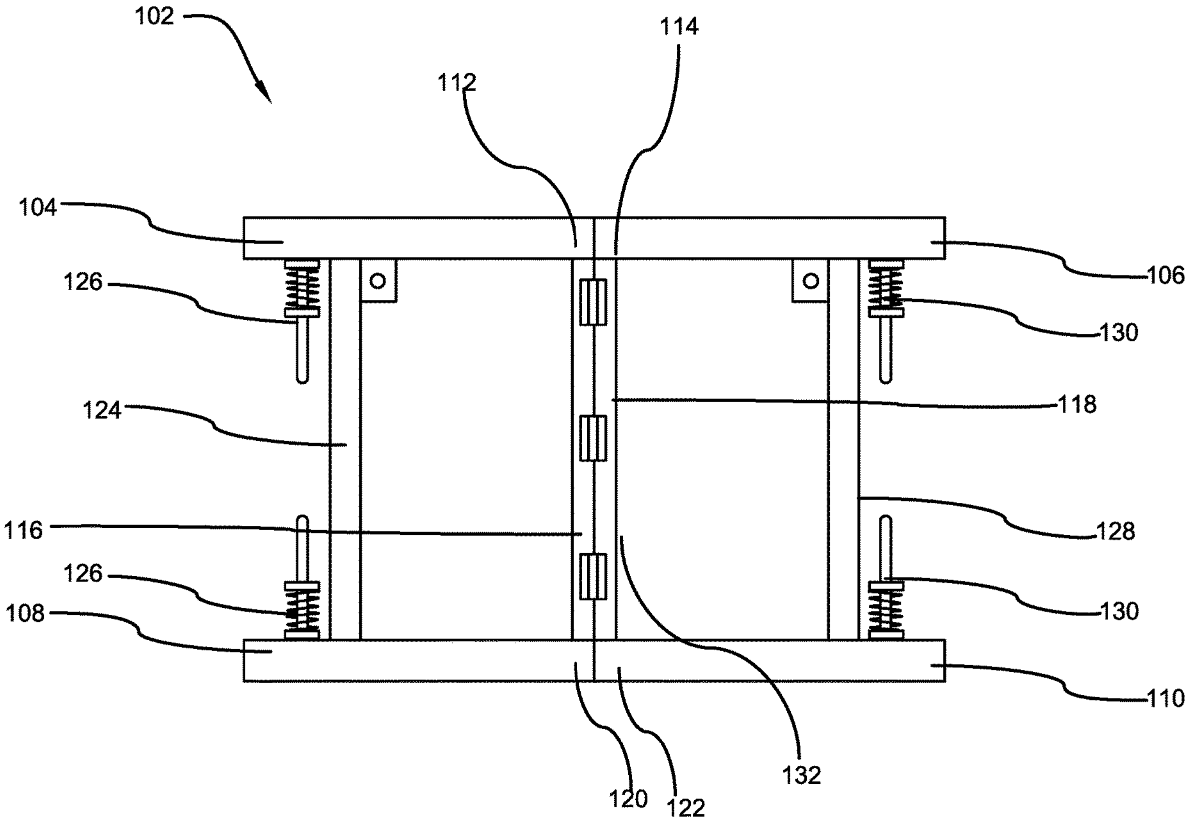
FIG. 2 illustrates a perspective view of a center chassis used in the tow dolly of the present invention in accordance with the disclosed structure.
Figure 3:
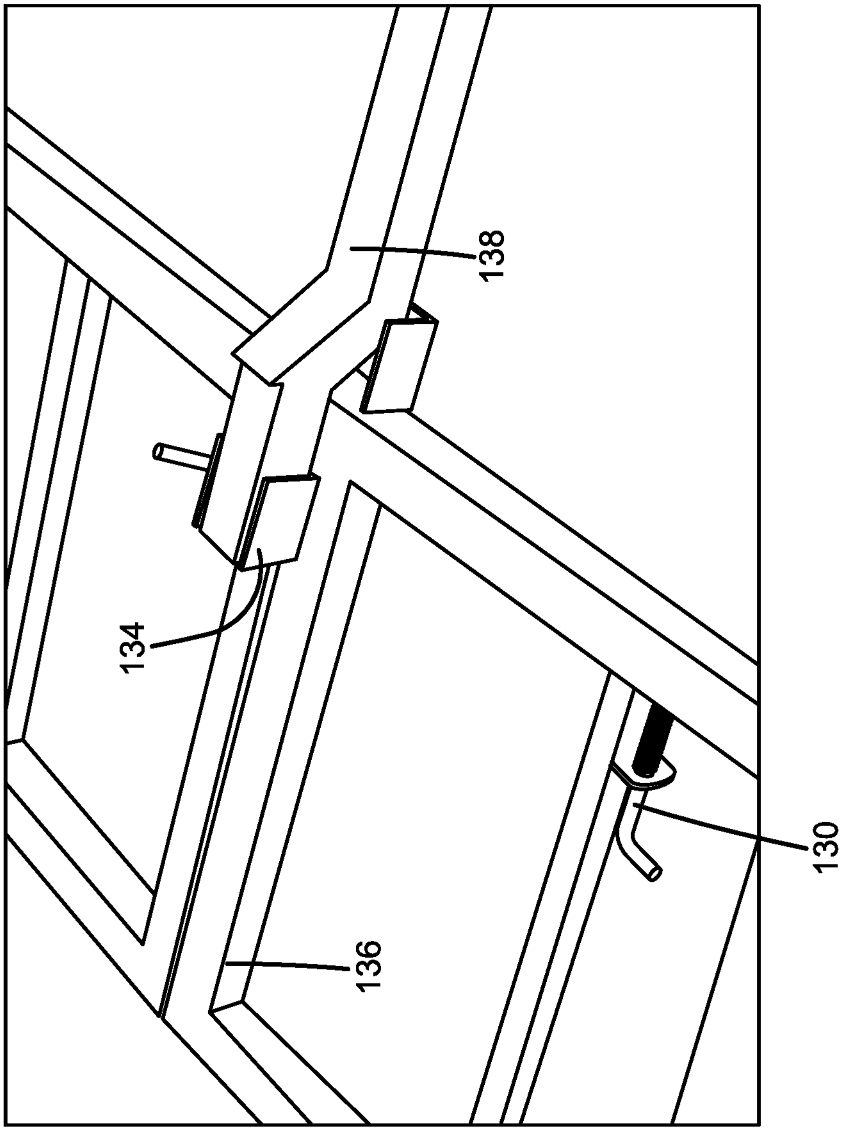
FIG. 3 illustrates another perspective view of the center chassis used in the tow dolly of the present invention in accordance with the disclosed structure.

Referring to FIGS. 1, 2 and 3, the center chassis 102 which forms a central part of the tow dolly 100 includes square bar stock (i.e., steel square bar or steel square tube) outer center arm pieces 104, 106, 108, 110 wherein the square bar stock, steel square bar, or steel square tube outer center arm pieces 104, 106 are connected (welded) to the top end 112, 114 of the center vertical square bar stock pieces 116, 118. The square bar stock outer center arm pieces 108, 110 are connected to the bottom end 120, 122 of the center vertical square bar stock pieces 116, 118.

A first square bar stock (i.e., steel square bar or steel square tube) center support piece 124 extends across the square bar stock outer center arm pieces 104, 108 and includes welded barrel locks 126 and a pair of attachment mounts for an X-brace 140 as illustrated in FIG. 4. Similarly, a second square bar stock center support piece 128 extends across the square bar stock outer center arm pieces 106, 110 and includes welded barrel locks 130 and a pair of attachment mounts for X-brace 140. The center chassis 102 also includes three 3-inch heavy-duty hinges 132 welded underneath. The center chassis 102 includes an angle iron 134 for a top tongue 138 and a separate angle iron 136 for rear pin of the center chassis 102 as illustrated in FIG. 3. The barrel locks 126, 130 are also used for securing the wheel platforms to the center chassis as described in FIG. 13.

FIG. 4 illustrates a top perspective view of the X-brace attachment used in the tow dolly 100 of the present invention in accordance with the disclosed structure. The X-brace attachment 140 includes a first elongated member 142 and a pair of other two elongated members 144, 146 are integrated using a technique such as welding at the center 148 of the first elongated member 142. The opposing ends 150, 152 of the first elongated member 142 and the opposing ends 154, 156 of the members 144, 146 have a steel plate 158 welded thereto wherein the steel plates 158 are used for attaching the X-brace attachment 140 to the bottom of the center chassis 102 as illustrated in FIG. 1. The X-brace attachment 140 is used for providing stability and strength to the center chassis 102.

In one embodiment, the first elongated member 142 can be from 24 inches to 30 inches in length and the members 144, 146 can be from 10 inches to 16 inches in length. The steel plate 158 can be generally square or rectangular and can have sides having a length from 1 inch to 4 inches.

FIG. 5 illustrates a perspective view of the top tongue used in tow dolly of the present invention in accordance with the disclosed architecture. The top tongue 138 includes a first member 160 welded to a second member 162, wherein the second member 162 is welded at a downward angle. The second member 162 at the opposite end thereof is welded to an elongated member 164. The top tongue 138 includes a pair of hitch pin holes 166, 168.

FIG. 6 illustrates a perspective view of the bottom tongue used in tow dolly of the present invention in accordance with the disclosed architecture. The bottom tongue 170 includes a 2½ inch C Channel 172 welded to a steel member 174 at an angled upward pitch square bar stock 176. The bottom tongue 170 also has a pair of tongue outer support arms 178 which can be about two feet and three inches in length. A pair of inner tongue support arms 180 are integrated across the 2½ inch C Channel 172 and the pair of tongue outer support arms 178. Tongue support arms 178, 180 help keep the tongue 170 straight with the chassis 102 as well as balanced for an even pull to both sides of the chassis 102 while loaded.

A receiver coupler 182 is used for receiving a hook for towing a vehicle and has chains 184 for additional support. The two inch square bar stock 176 tapers to a four inch angle change portion 186 which is about one foot in length.

The 2½ inch C Channel 172 also extends to a C-channel taper portion 188 which further extends to four inch C-channel 190. The ends of the outer support arms 178 have chassis attachments 192 for attaching the bottom tongue 170 to the central chassis 102.

Figure 7:
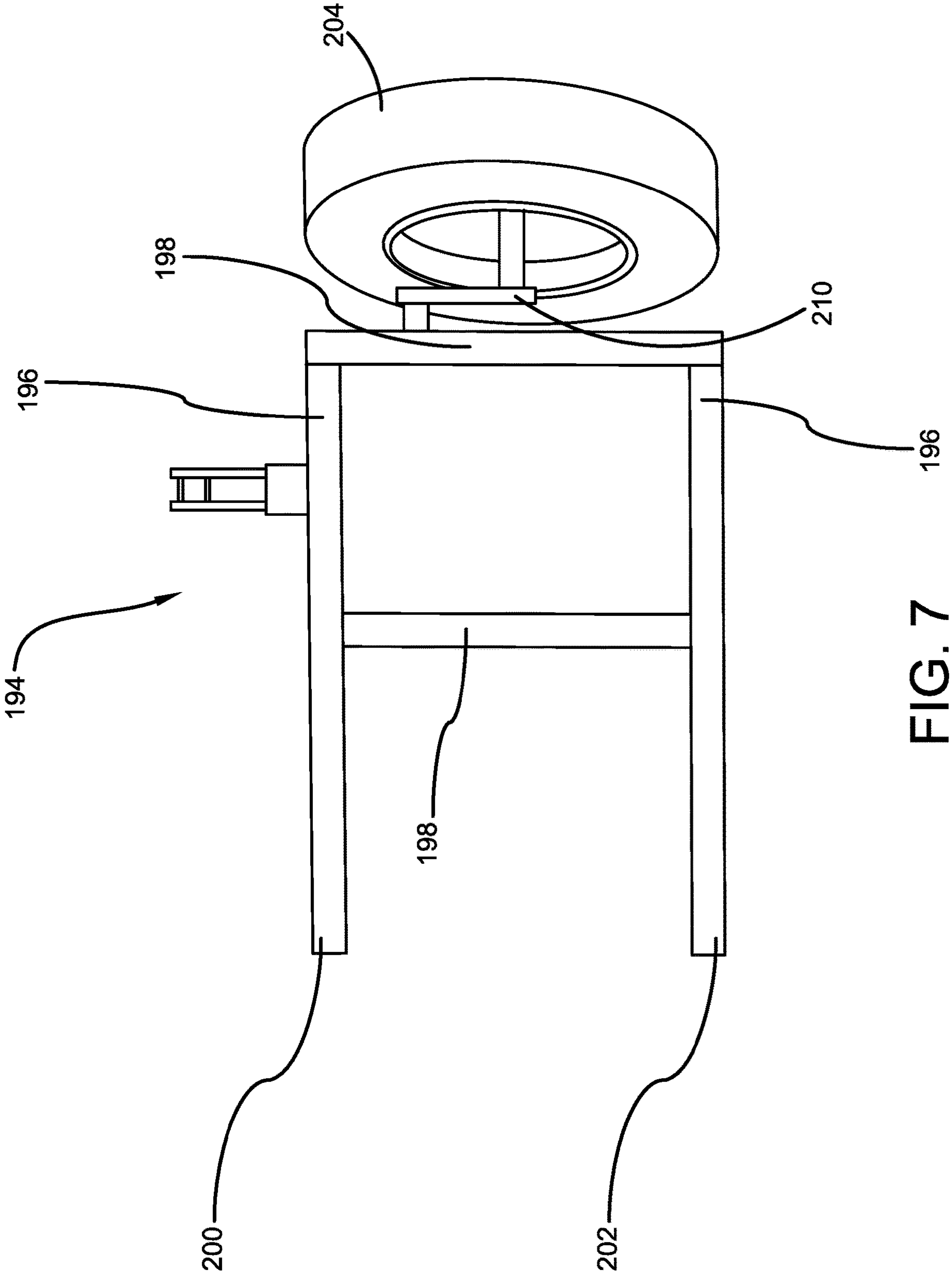
FIG. 7 illustrates a top perspective view of the wheel platform used in the foldable tow dolly of the present invention in accordance with the disclosed structure.

FIG. 7 illustrates a top perspective view of the wheel platform used in the foldable tow dolly of the present invention in accordance with the disclosed structure. As illustrated in FIG. 1, the tow dolly 100 includes a pair of wheel platforms where both the wheel platforms are symmetrical and are preferably made of the same dimensions. More specifically, the wheel platform 194 has a pair of horizontal bars 196 made of square bar stock and has a pair of vertical square bar stock 198.

A top inside center arm 200 and a bottom inside center arm 202 extends from the horizontal bars 196 wherein the inside center arm 200 slides into the center outer arm 106 and the bottom inside center arm 202 slides into the center outer arm 110 to attach the wheel platform 194 to the center chassis 102 as illustrated in FIG. 1.

The three hinges 132 as illustrated in FIG. 2 are welded to the center vertical square bar stock pieces 116, 118 which allow for articulation of the dolly 100. With the center inner arms 200, 202 of the wheel platform 194 inserted to the center outer arms 106, 110 of the chassis 102 and locked into place, the three hinges 132 welded to the center chassis allow the center chassis to fold upward and the wheel platform 194 to fold in like wings to fold the dolly.

It should be noted that although the arrangement of connection of the wheel platform 194 and the chassis 102 is described herein but the connection of the opposite wheel platform 226 and the chassis 102 is achieved in the same manner with the coupling of corresponding center inner arms of the wheel platform 226 by inserting them into the center outer arms 104, 108 of the chassis 102.

The wheel platform 194 can be held in a permanent position with spring-loaded heavy-duty spring-loaded barrel locks as disclosed in FIG. 2 and can be adjusted from side to side with the in and out motion to acquire the desired wheelbase. The casters are welded in place as shown in the FIG. 8. The wheel platform 194 has the wheel 204 for easy movement of the wheel platform 198. The other wheel platform can be attached to the center chassis 102 in the similar way.

FIG. 8 illustrates the bottom view of the wheel platform of FIG. 7 in accordance with disclosed structure. The wheel platform 194 has a stop plate 206 and a stop bar 208. For movement of the wheel 204, an axle 210 is provided and the casters 212 are welded for easy movement of the wheel platform 194 on any surface. The casters 212 can preferably have a height of 3 inches.

The wheel platform 194 has a plurality of gussets 214 wherein each gusset can be made of angle iron and can be four inches long. The gussets 214 are positioned in the joining corners 216 of the wheel platform 194 where the wheel platform 104 connects with the center chassis 102. The wheel platform 194 also has a ratchet 218 with J-hook for securing basket straps 230 (illustrated in FIG. 1).

Figure 9:
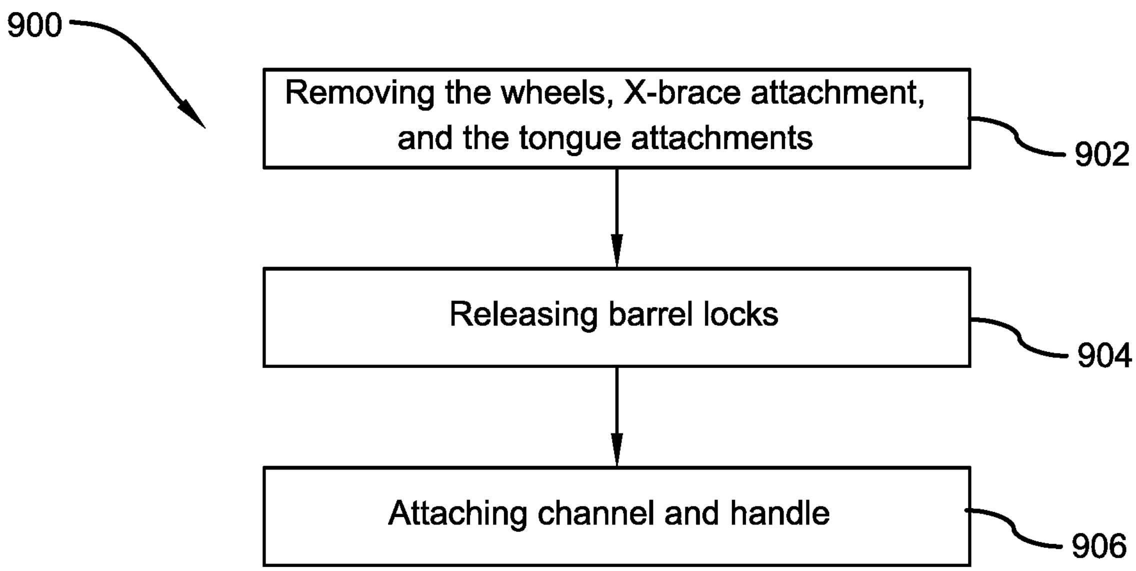
FIG. 9 illustrates a flow chart depicting a process of folding the tow dolly of the present invention in accordance with the disclosed structure.

FIG. 9 illustrates a flow chart 900 depicting a process of folding the tow dolly of the present invention in accordance with the disclosed structure. For folding the tow dolly 100 during non-use for transportation and storage, the wheels, X-brace attachment 140, and the tongue attachments 138, 170 are removed (Step 902). Then, the barrel locks positioned in the center chassis 102 are released for allowing articulation (Step 904). Thereafter, a cable wire or the chain is attached to keep the dolly 100 in the folded position and a handle is attached to the dolly 100 for pulling the dolly 100 in a desired position (Step 906).

Figure 10:
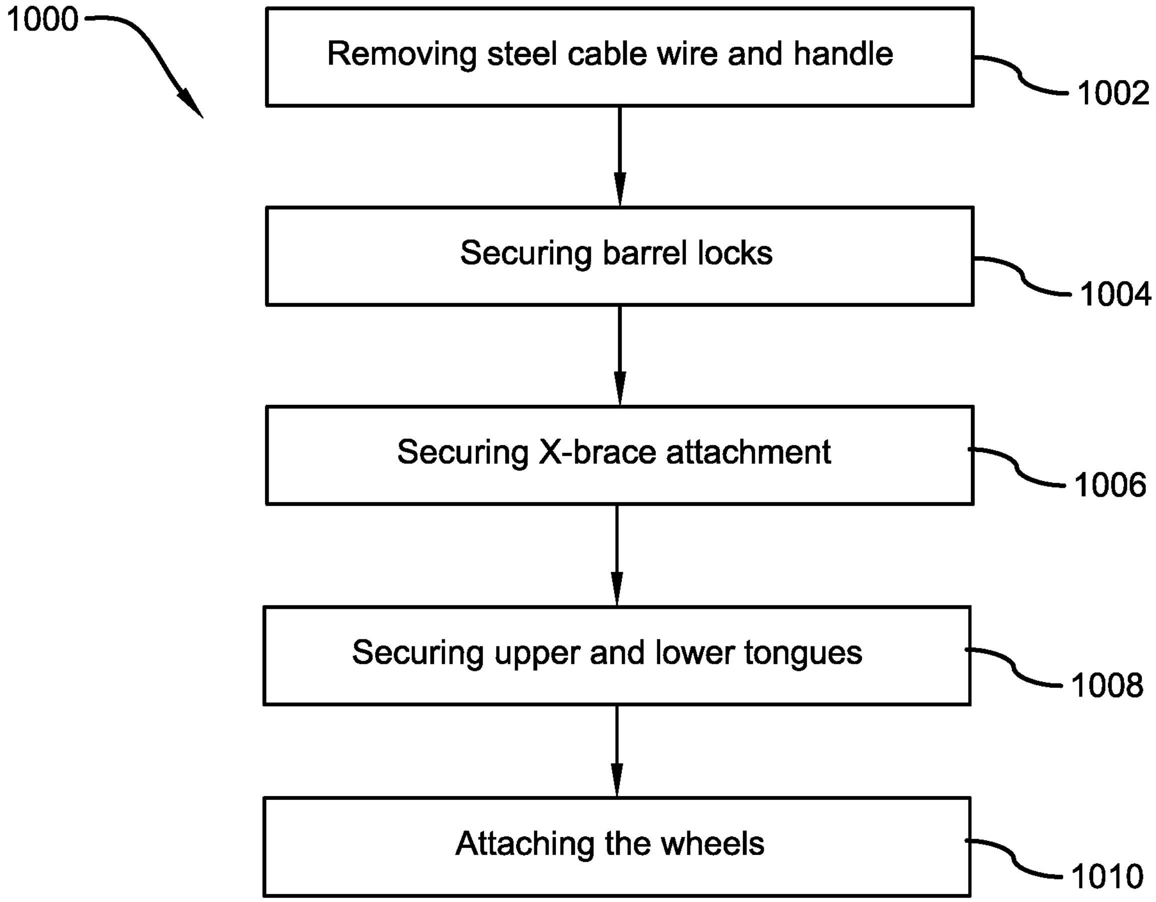
FIG. 10 illustrates a flow chart depicting a process of unfolding or assembling the tow dolly of the present invention for towing a vehicle in accordance with the disclosed structure.

FIG. 10 illustrates a flow chart depicting a process of unfolding or assembling the tow dolly of the present invention for towing a vehicle in accordance with the disclosed structure.

Figure 11:
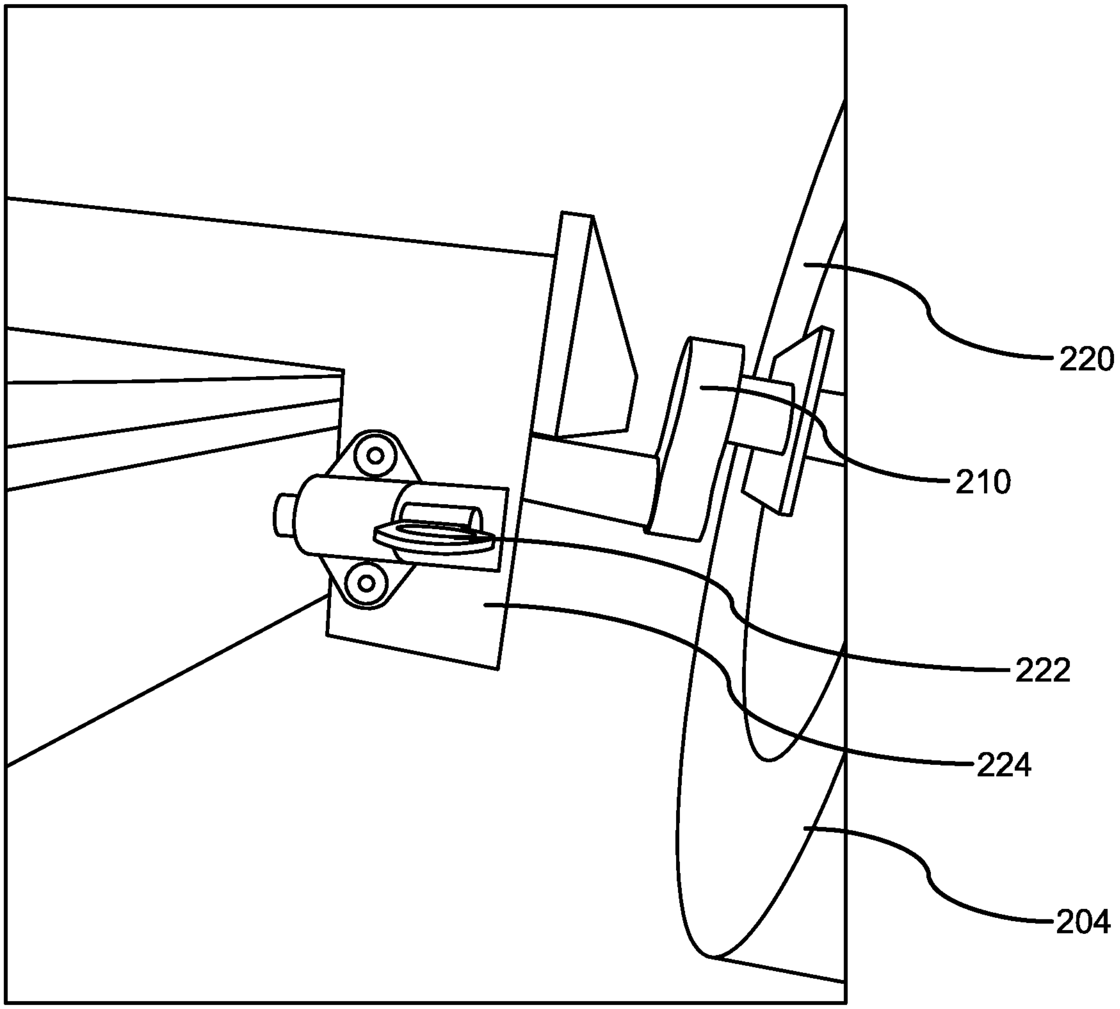
FIG. 11 illustrates an enlarged view showing attachment of the wheel with the wheel platform in accordance with the disclosed structure.

Initially, the steel cable wire and handle are removed or released to allow the wheel platforms of the tow dolly to swing outwards from the locked position (Step 1002). Then, the spring-loaded barrel locks are used for securing the wheel platforms with the center chassis 102 (Step 1004). Then, the X-brace attachment 140 is secured using the steel plates to secure the chassis 102 from flexing (Step 1006). Thereafter, the lower tongue 170 is attached to the center chassis 102 using receiver pins and similarly, the top tongue 138 is attached to the chassis (Step 1008). Finally, the wheels 204 are attached to the wheel platforms 194 using the axle hub as illustrated in FIG. 11 (Step 1010). It is to be appreciated that the respective wheels 204, 228 include independent suspension comprising individual torsion axles 210, 211.

FIG. 11 illustrates an enlarged view showing attachment of the wheel 204 with the wheel platform in accordance with the disclosed structure. The wheel 204 is attached to tow dolly using the torsion axle 210 which prevents the wheel 204 from lateral movement. The axle 210 can be rated to 1750 pounds per wheel (3,500 pounds per pair). The arm angle of the axle 210 can be about 22 degrees down when the tow dolly 100 is unloaded and can come close to the lever 220 when the tow dolly 100 is fully loaded. Further, the tow dolly 100 has a ramp latch 222 for latching with the steel plate 224.

Figure 12:
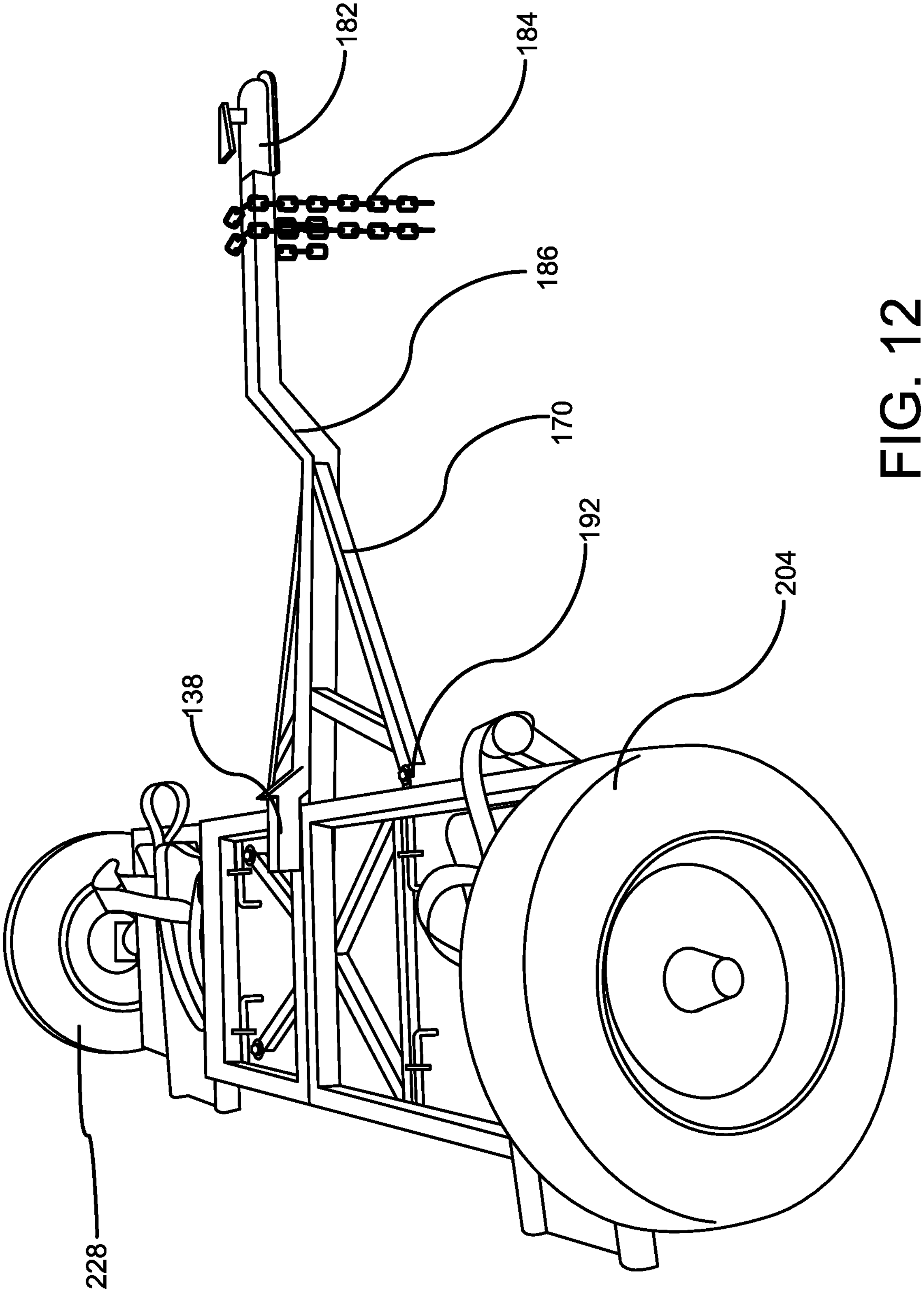
FIG. 12 illustrates a side perspective view of the tow dolly of the present invention in an unfolded position in accordance with the disclosed structure.

FIG. 12 illustrates a side perspective view of the tow dolly of the present invention in an unfolded position in accordance with the disclosed structure. The top tongue 138 is positioned on top of the bottom tongue 170 wherein the chassis attachments 192 are used for attaching the bottom tongue 170 to the central chassis 102. The receiver coupler 182 is coupled to rear of an RV or another vehicle and the four inch angle change portion 186 helps in providing a desired orientation of the bottom tongue 170 for towing a vehicle placed on the wheel platforms 194, 226.

Figure 13:
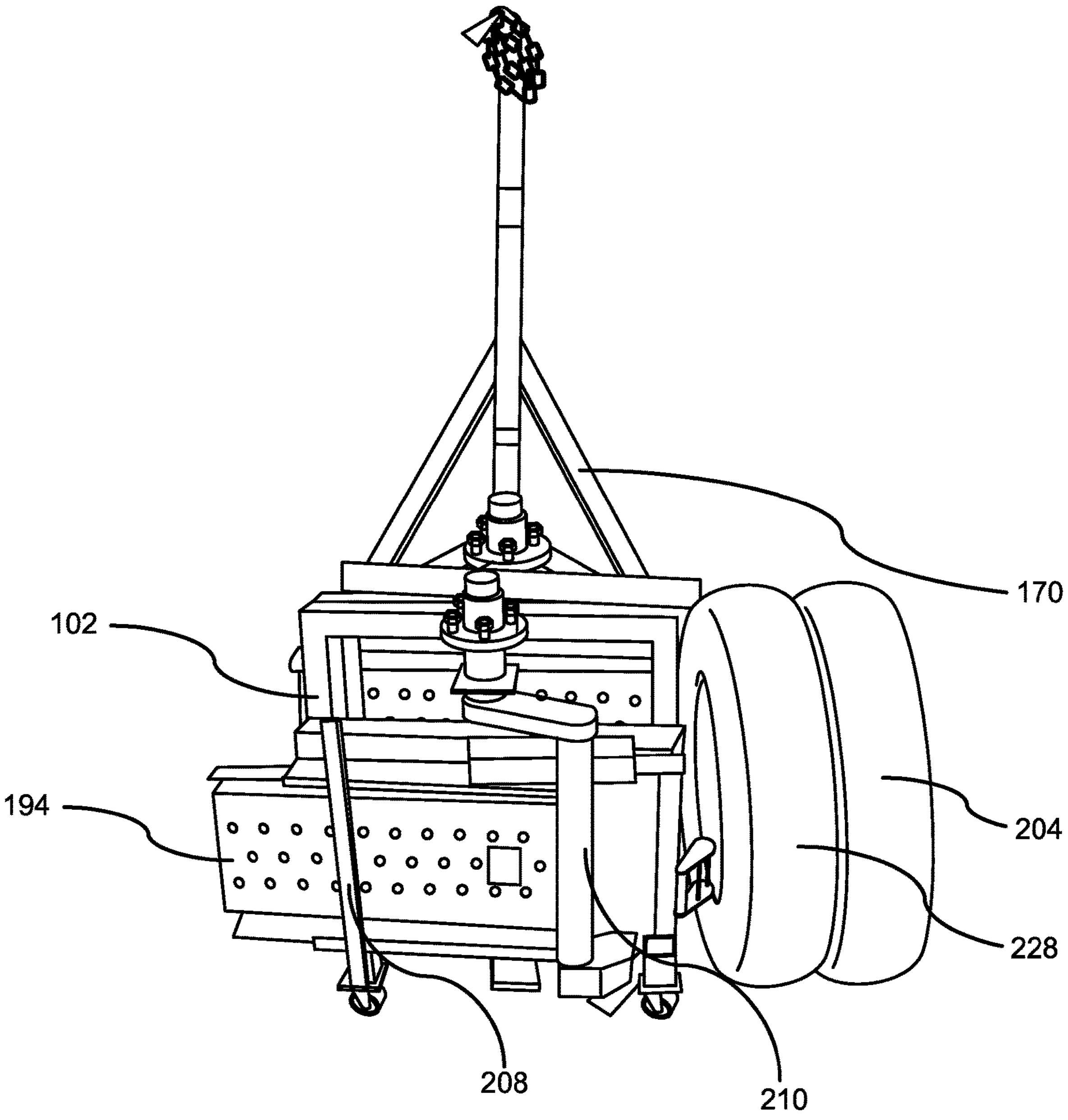
FIG. 13 illustrates the tow dolly of the present invention in a folded position for storage in accordance with the disclosed structure.

FIG. 13 illustrates the tow dolly of the present invention in a folded position for storage in accordance with the disclosed structure. As described in FIG. 9, for folding the dolly 100, the X-bar attachment 140 is removed by unfastening the steel plates and the barrel locks 126, 130 securing the chassis 102 and platforms 194, 226. Then, the wheels 204, 228 are removed and the wheel platforms 194, 226 are articulated to overlap each other to fold the tow dolly 100 for easy transportation and storage.

For tilting the tow dolly 100, the receiver pin between the upper tongue 138 and the lower tongue 170 is removed and the lower tongue 170 is removed from the chassis 102 by removing chassis attachments 192, for allowing the dolly 100 to tilt.

The tow dolly 100 can be adjusted for different vehicles by releasing the spring-loaded barrel locks 126, 130 to pull the wheel platforms 194, 226 outwards or inwards to achieve a desired wheelbase. The spring-loaded barrel locks 126, 130 can be locked to secure the wheel platforms with the center chassis 102.

Certain terms are used throughout the following description and claims to refer to particular features or components. As one skilled in the art will appreciate, different people may refer to the same feature or component by different names. This document does not intend to distinguish between components or features that differ in name but not structure or function. As used herein "tow dolly", "foldable tow dolly", "dolly", and "vehicle towing foldable dolly" are interchangeable and refer to the foldable tow dolly 100 of the present invention.

Notwithstanding the forgoing, the foldable tow dolly 100 of the present invention can be of any suitable size and configuration as is known in the art without affecting the overall concept of the invention, provided that it accomplishes the above stated objectives. One of ordinary skill in the art will appreciate that foldable tow dolly 100 as shown in the FIGS. 1-13 are for illustrative purposes only, and that many other sizes and shapes of the foldable tow dolly 100 are well within the scope of the present disclosure. Although the dimensions of the foldable tow dolly 100 are important design parameters for user convenience, the foldable tow dolly 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A foldable vehicle tow dolly comprising:

a vehicle tow dolly having a center chassis frame, a plurality of barrel locks, a first wheel platform and a second wheel platform, wherein said first wheel platform and said second wheel platform are connected to opposing sides of said center chassis frame;

wherein each wheel platform having a wheel proximal thereto for movement of said vehicle tow dolly over a road surface;

wherein a first pair of barrel locks mounted to a first side of said center chassis frame and a second pair of barrel locks mounted to an opposing second side of said center chassis frame, further wherein said first pair of barrel locks selectively locks said first wheel platform at a first distance relative to said center chassis frame and said second pair of barrel locks selectively locks said second wheel platform at a second distance relative to said center chassis frame for securing said vehicle tow dolly in an unfolded position at a selected wheelbase corresponding to a towed vehicle; and further wherein said center chassis frame selectively and hingedly articulates from a folded to an unfolded orientation.

2. The foldable vehicle tow dolly of claim 1, wherein each of said wheel platforms has a basket strap for securing a wheel of a towed vehicle.

3. The foldable vehicle tow dolly of claim 1, wherein said center chassis frame having a material of steel square tube.

4. The foldable vehicle tow dolly of claim 1, wherein each of said first wheel platform and said second wheel platform selectively and hingedly articulates from a folded generally vertical orientation to an unfolded generally horizontal orientation.

5. The foldable vehicle tow dolly of claim 4, wherein said center chassis frame having a selectively removable X-brace attachment for providing stability to said center chassis frame during towing of a vehicle.

6. The foldable vehicle tow dolly of claim 5, wherein said center chassis frame having a selectively removable tongue portion extending from a center area for coupling to a tow vehicle's receiver hitch.

7. The foldable vehicle tow dolly of claim 5, wherein said center chassis frame having a first center support member including said first pair of barrel locks and a first pair of X-brace mounts, and further wherein said center chassis frame having a second center support member including said second pair of barrel locks and a second pair of X-brace mounts.

8. The foldable vehicle tow dolly of claim 7, wherein said X-brace having a first pair of steel plates for mating with said first pair of X-brace mounts, and further wherein said X-brace having a second pair of steel plates for mating with said second pair of X-brace mounts.

9. The foldable vehicle tow dolly of claim 1, wherein said center chassis frame having a first rectilinear frame portion and a second rectilinear frame portion, and further wherein said first rectilinear frame portion hingedly connected to said second rectilinear frame portion.

10. The foldable vehicle tow dolly of claim 9, wherein said folded orientation is generally vertical and said unfolded orientation is generally horizontal.

11. The foldable vehicle tow dolly of claim 1, wherein said first wheel platform having a first pair of mounting arms slidingly engaged and fixed at said first distance relative to said center chassis frame and said second wheel platform having a second pair of mounting arms slidingly engaged and fixed at said second distance relative to said center chassis frame for securing said vehicle tow dolly in said unfolded position.

12. A foldable and transportable vehicle tow dolly comprising:

a vehicle tow dolly having a center chassis frame, a plurality of locking pins, a first wheel platform and a second wheel platform, wherein said first wheel platform and said second wheel platform are connected to opposing sides of said center chassis frame;

wherein each wheel platform having a wheel proximal thereto for movement of said vehicle tow dolly over a road surface;

wherein said tow dolly having an independent suspension, further wherein a first wheel having a first torsion axle attaching said first wheel to said first wheel platform and a second wheel having a second torsion axle attaching said second wheel to said second wheel platform;

wherein a first pair of locking pins mounted to a first side of said center chassis frame and a second pair of locking pins mounted to an opposing second side of said center chassis frame, further wherein said first pair of locking pins selectively locks said first wheel platform at a first distance relative to said center chassis frame and said second pair of locking pins selectively locks said second wheel platform at a second distance relative to said center chassis frame for securing said vehicle tow dolly in an unfolded position at a selected wheelbase corresponding to a towed vehicle;

wherein said center chassis frame selectively and hingedly articulates from a folded to an unfolded orientation;

wherein said center chassis frame having a selectively removable X-brace attachment for providing stability to said center chassis frame during towing of a vehicle; and further wherein said center chassis frame having a selectively removable tongue portion extending from a center area for coupling to a tow vehicle's receiver hitch.

13. The foldable and transportable vehicle tow dolly of claim 12, wherein each of said wheel platforms has a basket strap for securing a wheel of a towed vehicle.

14. The foldable and transportable vehicle tow dolly of claim 12, wherein said center chassis frame having a material of steel square tube.

15. The foldable and transportable vehicle tow dolly of claim 12, wherein said first wheel platform having a first pair of casters and said second wheel platform having a second pair of casters, and further wherein said first pair of casters and said second pair of casters engage a surface thereunder upon articulating said first wheel platform and said second wheel platform from said unfolded generally horizontal orientation to said folded generally vertical orientation.

16. The foldable and transportable vehicle tow dolly of claim 12, wherein said center chassis frame having a first rectilinear frame portion and a second rectilinear frame portion, and further wherein said first rectilinear frame portion hingedly connected to said second rectilinear frame portion.

17. The foldable and transportable vehicle tow dolly of claim 12, wherein said folded orientation is generally vertical and said unfolded orientation is generally horizontal.

18. The foldable and transportable vehicle tow dolly of claim 12, wherein said first wheel platform having a first pair of mounting arms slidingly engaged and fixed at said first distance relative to said center chassis frame and said second wheel platform having a second pair of mounting arms slidingly engaged and fixed at said second distance relative to said center chassis frame for securing said vehicle tow dolly in said unfolded position.

19. A method of folding and transporting a vehicle tow dolly, the method comprising the steps of:

providing a vehicle tow dolly having a center chassis frame, an X-brace attachment, a tongue portion, a plurality of locking pins, a first wheel platform and a second wheel platform, wherein said first wheel platform and said second wheel platform are connected to opposing sides of said center chassis frame, and further wherein each wheel platform having a pair of casters and a wheel proximal thereto for movement of said vehicle tow dolly over a road surface;

removing said X-brace attachment from said center chassis frame;

removing said tongue portion from said center chassis frame;

removing said wheels from said first wheel platform and said second wheel platform;

releasing a first pair of locking pins mounted to a first side of said center chassis frame and articulating said first wheel platform to a generally vertical orientation;

releasing a second pair of locking pins mounted to a second side of said center chassis frame and articulating said second wheel platform to a generally vertical orientation; and hingedly articulating said center chassis frame from a generally horizontal unfolded orientation to a generally vertical folded orientation.

20. The method of folding and transporting the vehicle tow dolly of claim 19 further comprising a step of rolling said vehicle tow dolly on said casters to transport a folded said vehicle tow dolly.

* * * * *